United States Patent
Kubo et al.

(10) Patent No.: US 9,002,108 B2
(45) Date of Patent: Apr. 7, 2015

(54) COLOR PROCESSING DEVICE THAT CONVERTS COMBINATION OF COLORS INTO LARGER NUMBER OF COMBINATION OF COLORS, COLOR PROCESSING METHOD, AND STORAGE MEDIUM

(75) Inventors: Masahiko Kubo, Kanagawa (JP); Toshifumi Takahira, Kanagawa (JP); Jun Koyatsu, Kanagawa (JP); Hidetoshi Kawashima, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 799 days.

(21) Appl. No.: 13/238,862

(22) Filed: Sep. 21, 2011

(65) Prior Publication Data

US 2012/0230584 A1 Sep. 13, 2012

(30) Foreign Application Priority Data

Mar. 7, 2011 (JP) .................................. 2011-049207

(51) Int. Cl.
  *G06K 9/00* (2006.01)
  *G06K 9/36* (2006.01)
  *H04N 1/46* (2006.01)
  *H04N 1/60* (2006.01)

(52) U.S. Cl.
  CPC ........... *H04N 1/6016* (2013.01); *H04N 1/6022* (2013.01)

(58) Field of Classification Search
  None
  See application file for complete search history.

(56) References Cited

U.S. PATENT DOCUMENTS

| 5,982,993 | A * | 11/1999 | Slade | 358/1.9 |
| 6,312,101 | B1 * | 11/2001 | Couwenhoven et al. | 358/521 |
| 7,710,620 | B2 * | 5/2010 | Sakakibara et al. | 358/518 |
| 2005/0068553 | A1 * | 3/2005 | Otake et al. | 358/1.9 |
| 2007/0247678 | A1 * | 10/2007 | Takahashi et al. | 358/515 |
| 2009/0073474 | A1 * | 3/2009 | Saito et al. | 358/1.9 |
| 2009/0303556 | A1 * | 12/2009 | Lieberman et al. | 358/515 |
| 2011/0058224 | A1 * | 3/2011 | Saito et al. | 358/3.13 |

FOREIGN PATENT DOCUMENTS

| JP | 01-128836 A | 5/1989 | |
| JP | 10098625 A * | 4/1998 | .............. H04N 1/60 |
| JP | 2003-341046 A | 12/2003 | |

(Continued)

OTHER PUBLICATIONS

Sasaki, Makoto, et al., "The Continuous Color Prediction Model based on Weighted Linear Regression", International Congress of Imaging Science, 2002, pp. 413-414.

Kon-No, Hiroshi, "Hisenkei-Keikaku-Ho (Nonlinear Programming)", JUSE Press, Ltd., 1978, pp. 284-287.

(Continued)

*Primary Examiner* — Bernard Krasnic
(74) *Attorney, Agent, or Firm* — Sughrue Mion, PLLC

(57) ABSTRACT

A color processing device includes a converter that converts a combination of values of N−1 colors obtained by eliminating a specific color included in N colors from an input color signal expressing a color by a combination of values of the N colors, into a corresponding combination of values of M−1 colors, N being 4 or larger, M being larger than N; and an output unit that, if a total value of the values of the M−1 colors after the conversion by the converter and a value of the specific color included in the input color signal exceeds a predetermined limit value, changes a value of at least one of M colors obtained by adding the specific color to the M−1 colors such that the total value becomes the limit value or smaller, and outputs values of the M colors as an output color signal.

13 Claims, 7 Drawing Sheets

(56) References Cited

FOREIGN PATENT DOCUMENTS

| | | | |
|---|---|---|---|
| JP | 2006-031376 A | 2/2006 | |
| JP | 4212742 B | 1/2009 | |

OTHER PUBLICATIONS

Communication dated Dec. 2, 2014 from the Japanese Patent Office in counterpart application No. 2011-049207.

* cited by examiner

COLOR PROCESSING DEVICE THAT CONVERTS COMBINATION OF COLORS INTO LARGER NUMBER OF COMBINATION OF COLORS, COLOR PROCESSING METHOD, AND STORAGE MEDIUM

CROSS-REFERENCE TO RELATED APPLICATIONS

This application is based on and claims priority under 35 USC 119 from Japanese Patent Application No. 2011-049207 filed Mar. 7, 2011.

BACKGROUND

The present invention relates to a color processing device, a color processing method, and a storage medium.

SUMMARY

According to an aspect of the invention, there is provided a color processing device including a converter that converts a combination of values of N−1 colors obtained by eliminating a specific color included in N colors from an input color signal expressing a color by a combination of values of the N colors, into a corresponding combination of values of M−1 colors, N being 4 or larger than N; M being larger than N; and an output unit that, if a total value of the values of the M−1 colors after the conversion by the converter and a value of the specific color included in the input color signal exceeds a predetermined limit value, changes a value of at least one of M colors obtained by adding the specific color to the M−1 colors such that the total value becomes the limit value or smaller, and outputs values of the M colors as an output color signal.

BRIEF DESCRIPTION OF THE DRAWINGS

Exemplary embodiment(s) of the present invention will be described in detail based on the following figures, wherein.

DETAILED DESCRIPTION

Figure 1:
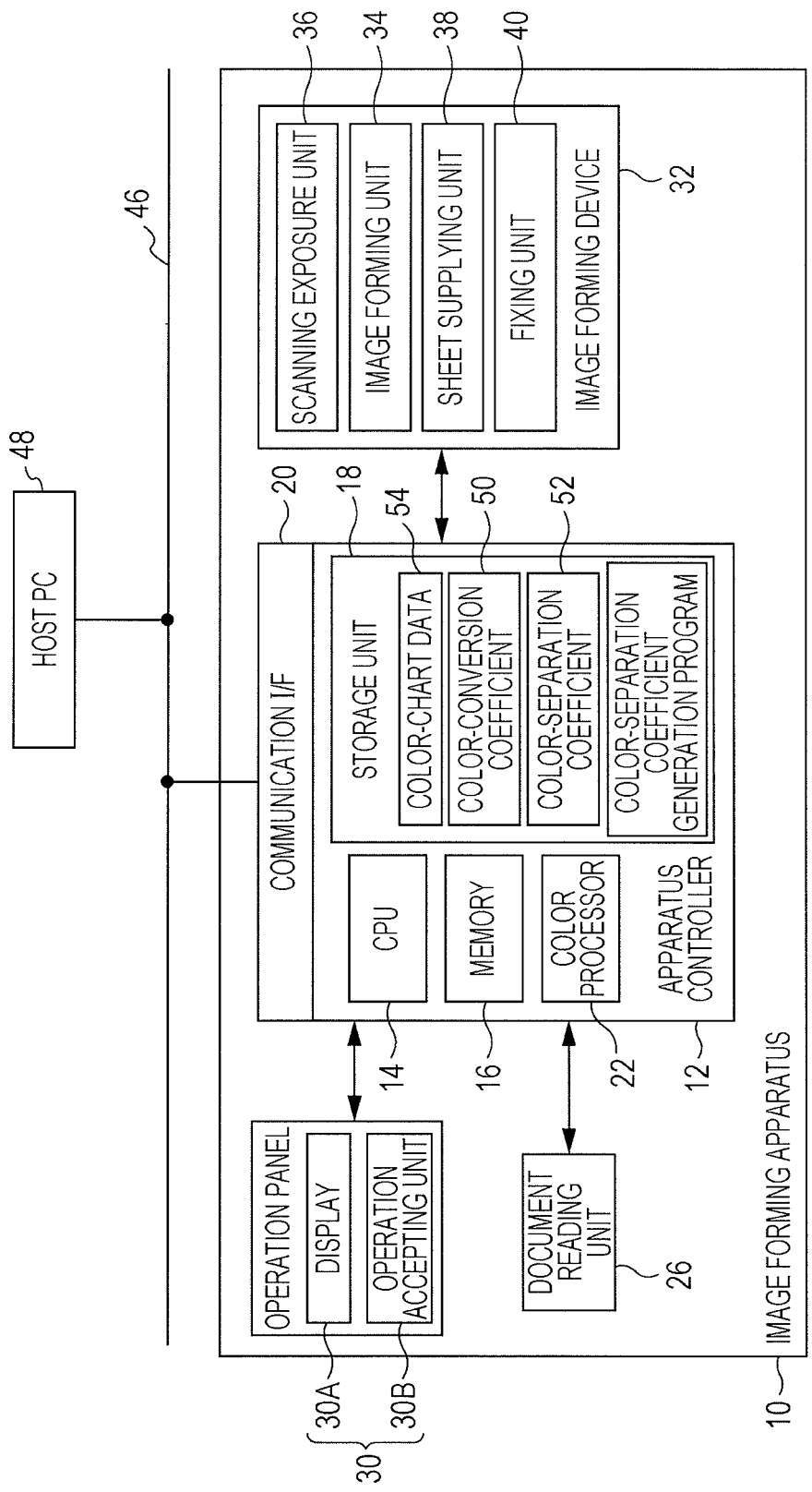
FIG. 1 is a block diagram schematically showing a configuration of an image forming apparatus described in an exemplary embodiment.

An exemplary embodiment of the present invention will be described below with reference to the accompanying drawings. FIG. 1 illustrates an image forming apparatus 10 according to this exemplary embodiment. The image forming apparatus 10 includes an apparatus controller 12 that functions as an example of a color processing device according to an exemplary embodiment of the present invention. The apparatus controller 12 includes a microcomputer. The apparatus controller 12 includes a CPU 14; a memory 16; a non-volatile storage unit 18 that is formed of, for example, a hard disk drive (HDD) or a flash memory, and stores an apparatus control program (not shown) for controlling operations of respective units of the image forming apparatus 10; and a communication interface (I/F) 20 that is connected with a host PC 48 through a communication line 46. The apparatus controller 12 receives image data expressing an image to be formed on a sheet, from the host PC 48 through the communication line 46.

The apparatus controller 12 also includes a color processor 22 that performs color processing containing color separation. The storage unit 18 of the apparatus controller 12 stores a color-conversion coefficient 50 and a color-separation coefficient 52 (the details of both will be described later) that are used when the color processor 22 performs the color processing. Also, the storage unit 18 has installed therein a color-separation coefficient generation program for performing color-separation coefficient generation processing (described later) that is performed by the apparatus controller 12. The storage unit 18 further stores a color-chart data 54 that is used when a color chart is formed in the color-separation coefficient generation processing. The color-separation coefficient 52 is generated by the color-separation coefficient generation processing.

The image forming apparatus 10 includes a document reading unit 26, an operation panel 30, and an image forming device 32 that are connected with the apparatus controller 12. The document reading unit 26 reads an image on a set document, and outputs image data that is obtained by reading to the apparatus controller 12. The operation panel 30 includes a display 30A that is formed of a liquid crystal display (LCD) or the like and displays various information, and an operation accepting unit 30B that includes plural keys and accepts an information input operation by a user. The apparatus controller 12 controls displaying of information on the display 30A. Information input by the user and accepted by the operation accepting unit 30B is input to the apparatus controller 12.

The image forming device 32 forms an image expressed by the image data input from the apparatus controller 12, by using a toner as a colorant based on an electrophotographic system, transfers the image on a sheet, and fixes the image to the sheet. The image forming device 32 includes an image forming unit 34, a scanning exposure unit 36, a sheet supply unit 38, and a fixing unit 40. The image forming unit 34 includes a photoconductor member. A charging unit that electrically charges the photoconductor member, a developer that develops an electrostatic latent image formed on the photoconductor member by using a toner and hence forms a toner image, a transfer unit that transfers the toner image formed on the photoconductor member on a sheet, and a charge eliminating and cleaning unit that eliminates charge on the photoconductor member and cleans the photoconductor member, are provided in that order.

To be more specific, the apparatus controller 12 inputs image data of six colors in total including dark cyan (DC, cyan of dark color), light cyan (LC, cyan of light color), dark magenta (DM, magenta of dark color), light magenta (LM, magenta of light color), yellow (Y), and black (K) to the image forming device 32. The image forming device 32 forms images of the respective colors of DC, LC, DM, LM, Y, and K expressed by the image data of the respective colors of DC, LC, DM, LM, Y, and K by using toners of the respective colors of DC, LC, DM, LM, Y, and K as colorants based on the electrophotographic system, and forms an image in which the formed images of the respective colors of DC, LC, DM, LM, Y, and K are superposed on one another. The image in which the images of the respective colors of DC, LC, DM, LM, Y, and K are superposed on one another is formed such that six image forming units 34 for the respective colors of DC, LC, DM, LM, Y, and K are provided, images of the respective colors of DC, LC, DM, LM, Y, and K are formed by the image forming units 34, and the formed images are superposed on one another; or such that a single image forming unit 34 including developers of the respective colors of DC, LC, DM, LM, Y, and K is provided, and images of the respective colors of DC, LC, DM, LM, Y, and K are successively formed, and the formed images are superposed on one another.

The scanning exposure unit 36 includes an exposure light source that is formed of, for example, a semiconductor laser or a LED. The scanning exposure unit 36 modulates an exposure light beam emitted from the exposure light source in accordance with image data input from the apparatus controller 12, irradiates the photoconductor member of the image forming unit 34 with the exposure light beam, and hence forms an electrostatic latent image on the photoconductor member. If the six image forming units 34 corresponding to DC, LC, DM, LM, Y, and K are provided, the scanning exposure unit 36 includes six exposure light sources corresponding to DC, LC, DM, LM, Y, and K such that exposure light beams respectively emitted from the individual exposure light sources are modulated in accordance with image data of different colors and the photoconductor members of the different image forming units 34 are irradiated with the modulated exposure light beams. In contrast, if only the single image forming unit 34 is provided, the scanning exposure unit 36 modulates an exposure light beam emitted from a single exposure light source successively in accordance with image data of DC, LC, DM, LM, Y, and K, and the photoconductor member of the image forming unit 34 is irradiated with the modulated exposure light beams.

The sheet supply unit 38 takes a sheet stacked on a sheet stack portion and transports the sheet to the transfer unit of the image forming unit 34. The fixing unit 40 fixes an image to a sheet by heating the sheet with a toner image transferred thereon and by melting a toner by the transfer unit of the image forming unit 34.

Figure 2:
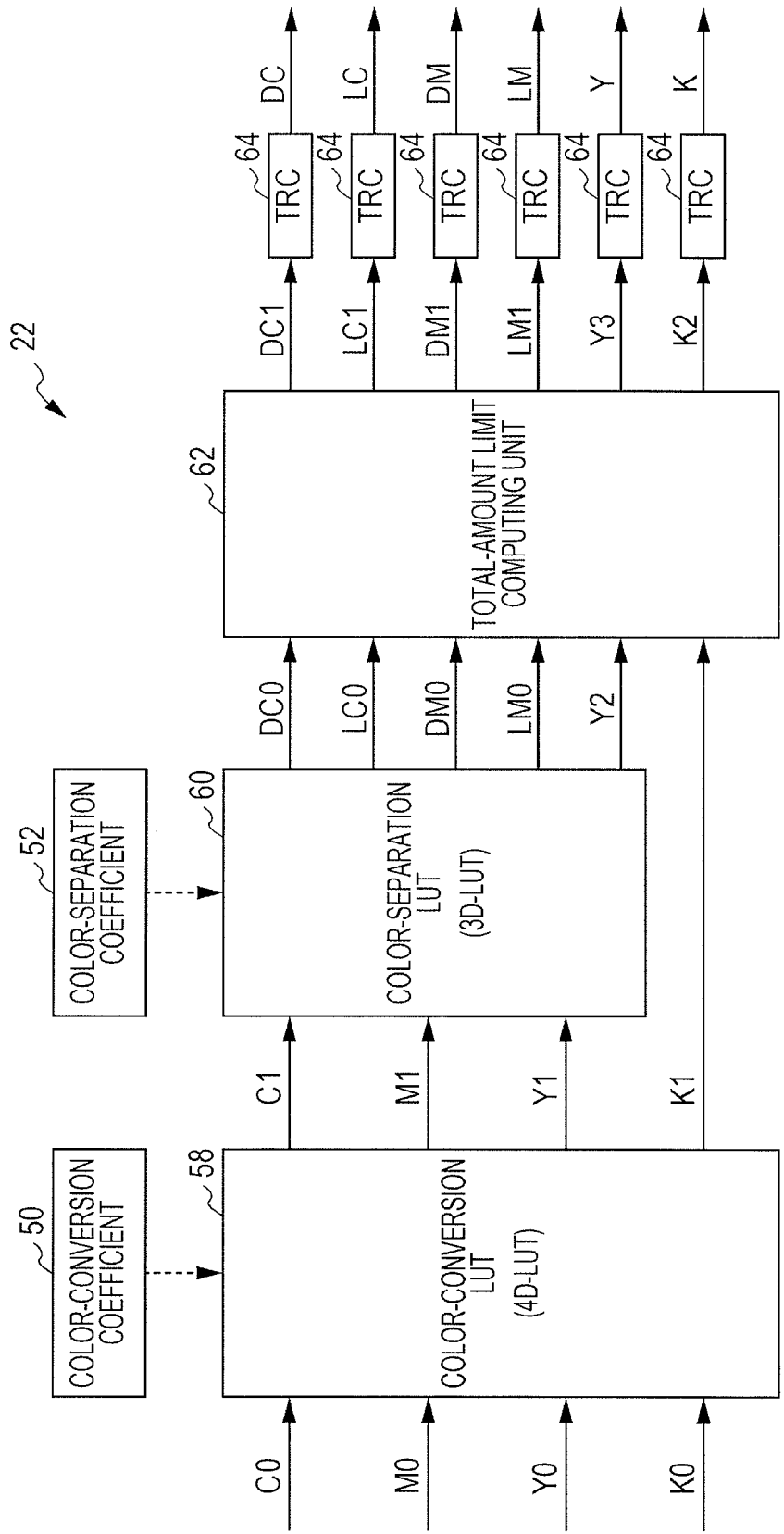
FIG. 2 is a block diagram schematically showing a configuration of a color processor.

The color processor 22 provided in the apparatus controller 12 is a processor that performs color processing of generating image data with which the image forming device 32 forms an image on a sheet (hereinafter, referred to as output image data), from image data received from the host PC 48 or image data input when the document reading unit 26 reads an image on a document (hereinafter, referred to as input image data). As shown in FIG. 2, the color processor 22 includes a color-conversion LUT 58, a color-separation LUT 60, a total-amount-limit computing unit 62, and tone reproduction curve (TRC) converters 64.

Described in this exemplary embodiment is an aspect in which the color-conversion LUT 58, the color-separation LUT 60, the total-amount-limit computing unit 62, and the TRC converters 64 that form the color processor 22 are provided in forms of hardware (electronic circuit). However, processing realized by the color-conversion LUT 58, the color-separation LUT 60, the total-amount-limit computing unit 62, and the TRC converters 64 may be realized according to an aspect in which a CPU of a computer (for example, the apparatus controller 12) executes a program. The program in this aspect is an example of color processing program according to an exemplary embodiment of the present invention. The program in this aspect may be previously stored on (installed in) the storage unit 18. Alternatively, the program may be provided in a form of a storage medium, such as a CD-ROM or a DVD-ROM.

The color-conversion coefficient 50 stored in the storage unit 18 is set in the color-conversion LUT 58 of the color processor 22. The input image data is converted into image data of a CMYK color space depending on the image forming device 32, based on the set color-conversion coefficient 50. The input image data is image data of any color space of, for example, a CMYK color space, a RGB color space, and a L*a*b* color space. FIG. 2 exemplarily illustrates a configuration in an aspect in which image data of a CMYK color space (image data expressing a color of each pixel of an image by a combination of values of four colors including C0, M0, Y0, and K0). In this aspect, the color-conversion LUT 58 is formed of a 4D LUT (4-input 4-output LUT).

The color-conversion coefficient 50 is set such that a color of each pixel of the image expressed by the image data input to the color-conversion LUT 58 is converted into a color corresponding to a color-reproduction characteristic of the image forming device 32 (an example of a color reproducing device according to an exemplary embodiment) to which output image data is input from the color processor 22. To be more specific, as an exemplary aspect in which image data of a CMYK color space is input as input image data, image data for printing an image by a plate printing system may be input as input image data. The plate printing system includes, for example, a plate making device (CTP, computer to plate) that creates a printing plate (plate) of the colors of C, M, Y, and K based on input image data, and a printing device (press) that prints an image on a sheet by using inks of the colors of C, M, Y, and K as colorants while the print plate created by the plate making device is being set. In this case, the color-conversion coefficient 50, which is set such that appearance of an image to be formed on a sheet by the image forming device 32 approaches appearance of colors of an image to be printed on a sheet by the plate printing system, is set in the color-conversion LUT 58. The color-conversion LUT 58 performs the color conversion in accordance with the set color-conversion coefficient 50.

The color-conversion coefficient 50 may be generated by using a color-prediction model (a color-prediction model that predicts values of L*a*b* of colors reproduced by the image forming device 32 from values of DC, LC, DM, LM, and Y input to the image forming device 32) defined by, for example, Expression (1) (described later). For example, Japanese Patent No. 4212742 describes the detail of the generation of the color-conversion coefficient 50, and hence the detail will not be described here. The color-conversion LUT 58 is an example of a color signal converter according to an exemplary embodiment. The image data output from the color-conversion LUT 58 and expressing a color of each pixel of an image by a combination of values of four colors including C1, M1, Y1, and K1 is an example of "an input color signal expressing a color by a combination of values of N colors (where N=4)" according to an exemplary embodiment.

The color-separation LUT 60 receives, from among the image data output from the color-conversion LUT 58 (i.e., image data expressing a color of each pixel of an image by a combination of values of the four colors including C1, M1, Y1, and K1), values of three colors including C1, M1, and Y1, which are obtained by eliminating K1. The color-separation coefficient 52 stored in the storage unit 18 is set in the color-conversion LUT 58. The color-separation coefficient 52 is a conversion coefficient that converts (performs color separation for) a color expressed by a combination of values of the three colors including C1, M1, and Y1 into a corresponding combination of values of five colors including DC0, LC0, DM0, LM0, and Y2. The color-conversion LUT 58 converts (performs color separation for) a combination of values of the three colors including C1, M1, and Y1 input for each pixel of the image into a corresponding combination of values of the five colors including DC0, LC0, DM0, LM0, and Y2 and outputs the combination. As described above, the color-separation LUT 60 is formed of a 3D LUT (3-input 5-output LUT).

The color-separation LUT 60 is an example of a converter according to an exemplary embodiment. K1 among the four colors including C1, M1, Y1, and K1 whose values are output for each pixel of the image from the color-conversion LUT 58 is an example of a "specific color included in N colors" according to an exemplary embodiment. Also, a combination of values of the five colors including DC0, LC0, DM0, LM0, and Y2 output for each pixel of the image from the color-separation LUT 60 is an example of a "combination of values of M−1 colors (where M=6)" according to an exemplary embodiment.

The total-amount-limit computing unit 62 receives values of the five colors including DC0, LC0, DM0, LM0, and Y2 output from the color-separation LUT 60 for each pixel of the image, and a value of K1 of the same pixel output from the color-conversion LUT 58. Although the detail is described later, the total-amount-limit computing unit 62 computes a total value (colorant total amount) of input values of the six colors including DC0, LC0, DM0, LM0, Y2, and K1 for each pixel of the image, and if the computed colorant total amount exceeds a predetermined limit value TAC, a value of at least one of the six colors is changed such that the colorant total amount becomes the limit value TAC or smaller, and outputs values of six colors including DC1, LC1, DM1, LM1, Y3, and K2. The total-amount-limit computing unit 62 is an example of an output unit according to an exemplary embodiment.

The color processor 22 includes the six TRC converters 64. The values of the six colors including DC1, LC1, DM1, LM1, Y3, and K2 output form the total-amount-limit computing unit 62 are respectively input to the six TRC converters 64. The six TRC converters 64 each are formed of a 1D LUT (1-input 1-output LUT). Each TRC converter 64 has a conversion coefficient set therein. The conversion coefficient is for correcting nonlinearity of a change in density of a corresponding color formed by the image forming device 32 with respect to a change in value of the corresponding color. Each TRC converter 64 performs tone reproduction curve (TRC) conversion that converts a value of an input color in accordance with the conversion coefficient.

The image data after the above-described color processing by the color processor 22 is output to the image forming device 32 as image data expressing a color of each pixel of the image by a combination of values of the six colors including DC, LC, DM, LM, Y, and K, and the image data is used when the image forming device 32 forms an image by using toners of the colors including DC, LC, DM, LM, Y, and K.

Next, an operation of this exemplary embodiment is described. Image data that is input to an image forming apparatus as image data expressing an image to be formed on a sheet is typically image data expressing a color by a combination of values of three colors (for example, R, G, and B) or four colors (for example, C, M, Y, and K) for each pixel of the image. Owing to this, to increase image quality of an image to be formed, if the image forming apparatus forms an image by using colorants of five or more colors, color separation has to be performed for a color expressed by a combination of values of three or four colors for each pixel of the image, into a combination of values of five or more colors.

Regarding this, there is a technique of related art that provides a distributor formed of a 1D (1-input 2-output) LUT for each color type, and data of two dark and light inks is generated from input data for each color type. However, if the total amount of colorants becomes excessive, ink bleed or the like may occur during image formation using inks, or dispersion of a toner, fixing failure of a toner, or the like, may occur during image formation using toners. Hence, when color separation is performed from a value of a specific color into values of two dark and light colors, the values of the two dark and light colors are desirably determined with regard to not only the value of the specific color but also the colorant total amount that changes depending on values of other colors. However, this is not realized by color separation based on the 1D LUT. With the related-art technique, since the values of the respective colors are markedly changed when the total amount of the colorants is limited after the color separation, graininess may be degraded, a tone jump may occur, and color-reproduction characteristic may be degraded, possibly resulting in that image quality may be degraded.

There is another technique of related art that performs color separation from four colors including C, M, Y, and K into six colors, which are obtained by adding LC and LM to the four colors of C, M, Y, and K by a 4D (4-input 6-output) LUT. However, the LUT holds a conversion coefficient that associates input data with output data, only for a predetermined grid point of an input data space with a number of dimensions corresponding to the number of pieces of the input data (for example, if the number of pieces of input data is four, an input data space becomes 4D), and computes output data for input data that is located between grid points in the input data space, from conversion coefficients of plural grid points existing around that grid point. Hence, the above-described technique realizes color separation regarding the colorant total amount by using the 4D LUT. However, a computational load for interpolation computation is extremely high (namely, a load is two times or more of a load of the 3D LUT). Processing time may markedly increase. If interpolation computation etc. is performed by hardware, the circuit scale may increase, and hence the cost may increase.

In contrast, in this exemplary embodiment, the 3D (3-input 5-output) LUT is provided as the color-separation LUT 60, based on that a region affecting apparent image quality is a region formed of pixels having colors formed without the colorant of K (pixels having a value of K from among C, M, Y, and K being 0) in an image expressed by image data of a CMYK color space, and that the affection of K is dominant for color appearance of a pixel whose color is formed by using the colorant of K. Values of the three colors including C1, M1, and Y1 but excluding K1, from among the four colors including C1, M1, Y1, and K1 of each pixel of an image output from the upstream color-conversion LUT 58 are input to the color-separation LUT 60. The color-separation LUT 60 converts a combination of values of the three colors including C1, M1, and Y1 into a combination of five colors including DC0, LC0, DM0, LM0, and Y2. Also, when the conversion is performed by the color-separation LUT 60 from C1, M1, and Y1 to DC0, LC0, DM0, LM0, and Y2, the color-separation coefficient 52 is determined such that the total value of values of the five colors including DC0, LC0, DM0, LM0, and Y2 (the colorant total amount of the five colors) after the conversion becomes the limit value TAC or smaller of the colorant total amount.

Hence, comparing with a case in which color separation is performed with a 4D LUT, the computational load for the interpolation computation is markedly decreased. Also, the color in the region (color of K=0) affecting the apparent image quality is prevented from being changed as the result of the limitation on the total amount of the colorants by the total-amount-limit computing unit 62. Also, regarding a color that is formed by using the colorant of K, at least one of the five colors including DC0, LC0, DM0, LM0, and Y2 may be changed as the result of the limitation on the total amount of the colorants by the total-amount-limit computing unit 62. However, the change in value of that color is prevented from affecting the appearance of the color formed with that color. In this exemplary embodiment, the interpolation computation or the like by the color-separation LUT 60 may be performed by a configuration using software or a configuration using hardware.

Figure 3:
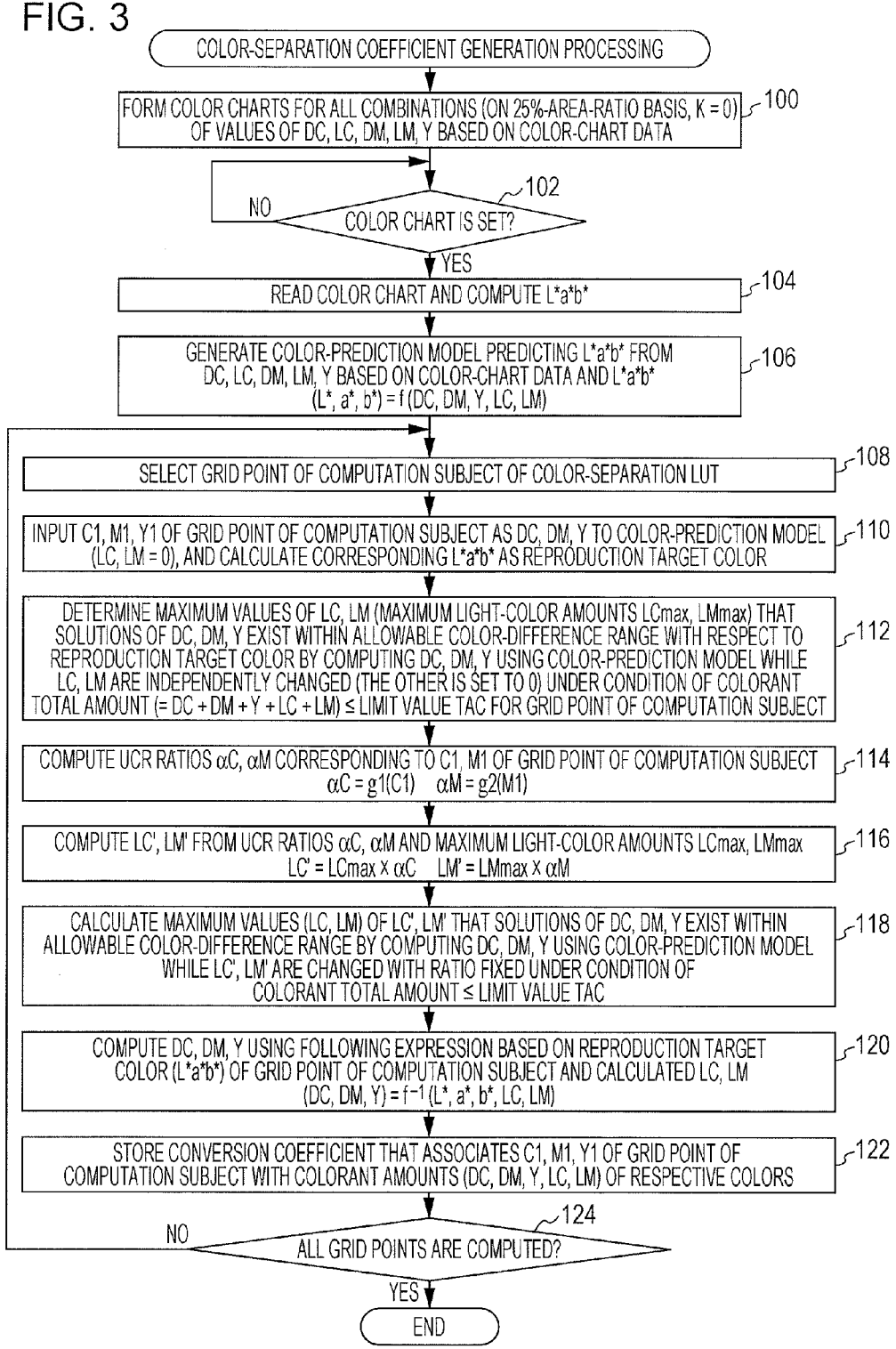
FIG. 3 is a flowchart showing contents of color-separation coefficient generation processing.

Next, color-separation coefficient generation processing that is realized such that the CPU 14 executes a color-separation coefficient generation program when the color-separation coefficient 52 is generated, will be described with reference to FIG. 3.

In the color-separation coefficient generation processing, in step 100, the color-chart data 54 is read from the storage unit 18 and is output to the image forming device 32. The image forming device 32 forms an image expressed by the color-chart data 54, i.e., an image in which plural color charts with different colors are arrayed, on a sheet. In this exemplary embodiment, the color-chart data 54 is data expressing an image in which color charts of respective colors corresponding to all combinations when values of DC, LC, DM, LM, and Y are changed on 25%-area-ratio basis under a condition of K=0 are arrayed. The image forming device 32 forms the image expressed by the color-chart data 54 on a sheet. Thus, the color charts of the respective colors are formed on the sheet.

In step 102, it is judged whether or not the sheet with the color charts of the respective colors formed thereon is set on the document reading unit 26. Step 102 is repeated until YES is obtained. When the sheet with the color charts of the respective colors is set on the document reading unit 26, YES is obtained in step 102, and the process goes to step 104. The document reading unit 26 reads the image on the set sheet, extracts regions corresponding to the color charts of the respective colors from an image obtained by reading, and computes L*a*b* for each of the extracted individual regions. This exemplary embodiment describes an aspect that measures the color charts by the document reading unit 26. However, a commercial colorimeter or the like may measure the color charts.

In step 106, the values of the respective colors including DC, LC, DM, LM, and Y of the individual color charts expressed by the color-chart data 54 and the values of L*a*b* of the color charts computed in step 104 are used as raw data, and a color-prediction model for predicting values of L*a*b* of a color reproduced by the image forming device 32 is generated from the values of DC, LC, DM, LM, and Y input to the image forming device 32 (also, see Expression (1)). Expression (1) is as follows:

$$(L^*, a^*, b^*)=f(DC, DM, Y, LC, LM) \quad (1).$$

The color-prediction model is for predicting and estimating color-conversion characteristics between different color spaces based on raw data expressing correspondence between few input colors and output colors. The color-prediction model includes a method using a statistical process (Makoto Sasaki and Hiroaki Ikegami, Proc. of International Congress of Imaging Science 2002 (2002) p. 413-414), a method using a neural network, or a method based on a physical model of, for example, Neugebauer or Kubelka-Munk. Any of these methods may be used.

In step 108, a grid point of a computation subject is selected from plural grid points previously set in an input data space of the color-separation LUT 60. In step 110, a combination of values of C1, M1, and Y1 of the grid point of the computation subject selected in step 108 is input as a combination of values of DC, DM, and Y to the color-prediction model generated in step 106 (assuming that LC, LM=0), and corresponding values of L*a*b* are calculated as a reproduction target color of the grid point of the computation subject with the color-prediction model.

In step 112, maximum values of LC, LM (maximum light-color amounts LCmax and LMmax) that solutions of DC, DM, and Y exist within an allowable color-difference range with respect to the reproduction target color of the grid point of the computation subject are determined, by computing DC, DM, and Y using the color-prediction model (the above-described Expression (1)) while LC and LM are independently changed (the other is set to 0) under a condition of colorant total amount (=DC+DM+Y+LC+LM)≤limit value TAC for the grid point of the computation subject. Minimum values of LC and LM (minimum light-color amounts LCmin and LMmin) that the solutions of DC, DM, and Y exist are 0.

Figure 4:
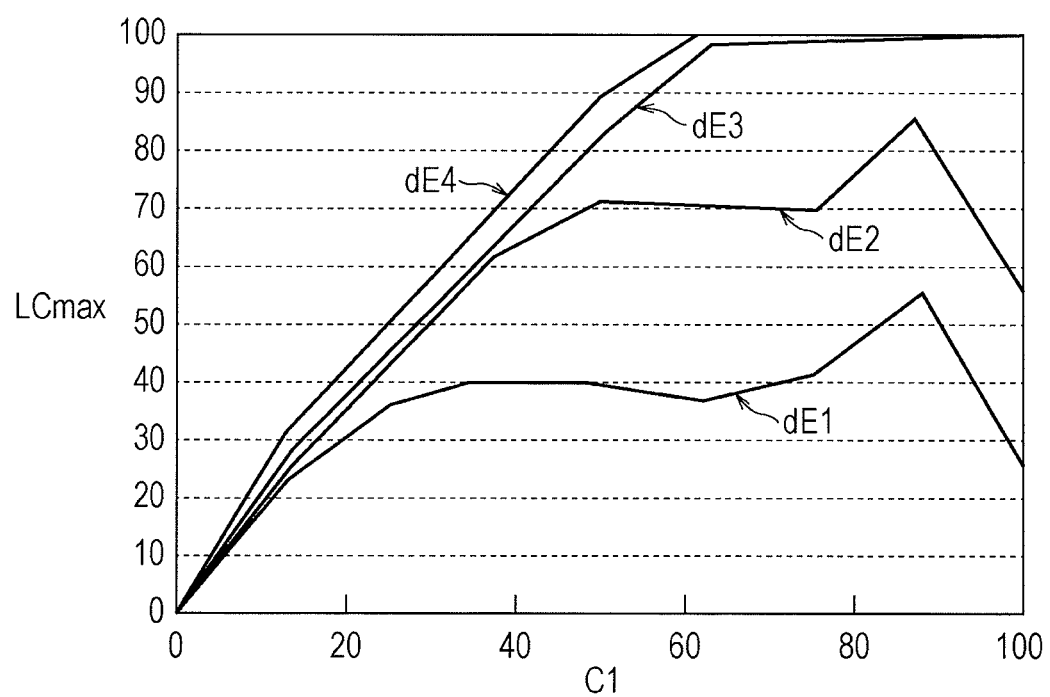
FIG. 4 is a diagram showing an example of a change in maximum light-color amount with respect to a change in value of an input color for each allowable color difference.

FIG. 4 exemplarily illustrates a relationship between a value of an input color C1 to the color-separation LUT 60 and a maximum light-color amount LCmax, for each of cases in which allowable color differences with respect to the reproduction target color are dE1 to dE4. The allowable color differences are as follows: dE1<dE2<dE3<dE4. As the allowable color difference increases, the maximum light-color amount LCmax increases. When the allowable color difference is dE3 or dE4, the maximum light-color amount LCmax reaches 100%. As described above, as the allowable color difference increases, the maximum light-color amount LCmax increases. Hence, graininess is improved as compared with a case with a small allowable color difference. Also, when the allowable color difference is dE3 or dE4, the maximum light-color amount LCmax monotonically increases as the value of C1 increases. Hence, gradation is improved. However, if the allowable color difference becomes large, a color shift with respect to the reproduction target color becomes large. Hence, the allowable color difference may be determined by taking into account both merit and demerit.

In step 114, under color removal (UCR) ratios αC and αM corresponding to values of C1 and M1 of the grid point of the computation target are computed by using functions g1 and g2 in Expression (2) as follows:

$$\alpha C=g1(C1),\ \alpha M=g2(M1) \quad (2).$$

In step 116, temporary values LC' and LM' of LC and LM are computed by Expression (3) as follows, based on the UCR ratios αC and αM computed in step 114 and the maximum light-color amounts LCmax and LMmax computed in step 112:

$$LC'=LCmax \times \alpha C,\ LM'=LMmax \times \alpha M \quad (3).$$

Figure 5A:
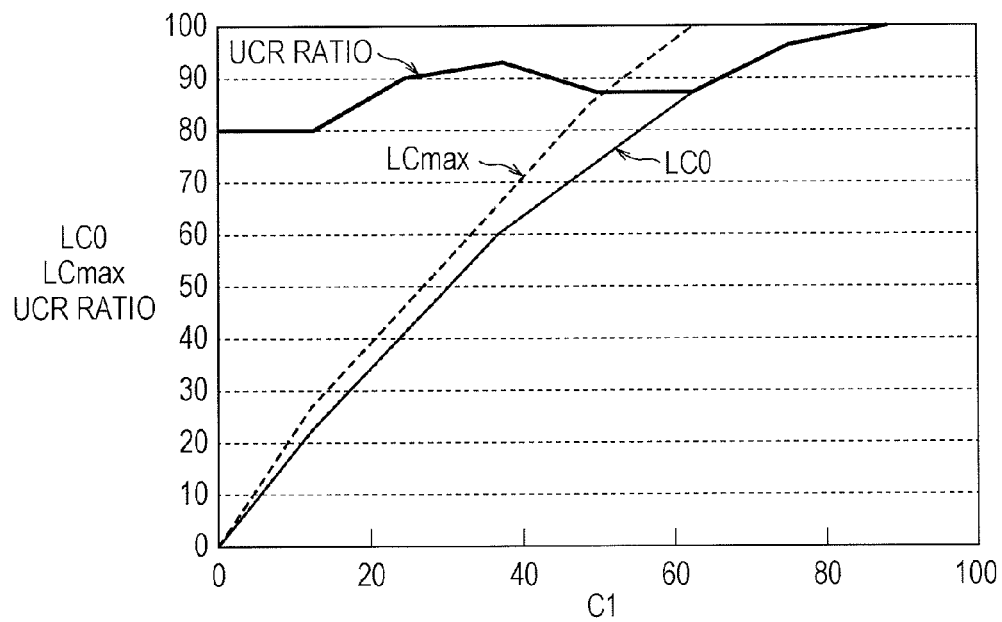
FIGS. 5A and 5B are diagrams each showing an example of change in an under color removal (UCR) ratio and a change in value of a light color with respect to a change in value of an input color.
Figure 5B:
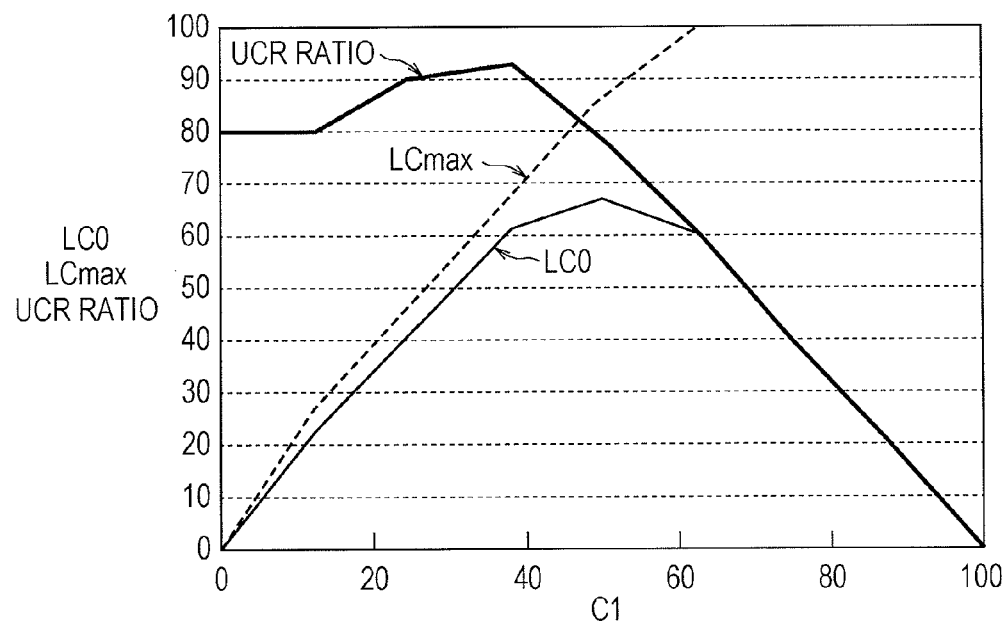

FIGS. 5A and 5B each exemplarily illustrate a relationship between the value of the input color C1 and the UCR ratio defined by the function g1 in Expression (2), together with changes in values of the maximum light-color amount LCmax and light color LC0 (output color LC0 from the color-separation LUT 60). In FIGS. 5A and 5B, the values of the maximum light-color amount LCmax and light color LC0 are values within a range from 0% to 100%, and commonly use the vertical axis.

In the example shown in FIG. 5A, the function g1 is set such that the UCR ratio becomes 100% and the value of the light color LC is aligned with the maximum light-color amount LCmax if the value of the input color C1 is in a range from about 90% to 100%. Also, the function g1 is set such that the UCR ratio is low if the value of the input color C1 is in a range from 0% to about 25% and in a range from about 45% to about 65%. If the input color C1 is in the range from 0% to about 25%, since the allowable color difference is provided for the determination of the maximum light-color amount LCmax, the color shift with respect to the reproduction target color decreases as compared with a case in which the value of the light color LC is aligned with the maximum light-color LCmax, by holding the UCR ratio low and the value of the light color LC low.

If the value of the input color C1 is in the range from about 45% to about 65%, the maximum light-color amount LCmax is changed from an increasing state to a constant value at a boundary at which the value of the input color C1 is about 60%. Owing to this, by holding the UCR ratio low within a range around the boundary, the value of the light color LC is held small as compared with the case in which the value of the light color LC is aligned with the maximum light-color amount LCmax. Accordingly, in the above-mentioned range, as the result of that the value of the light color LC is held small, the colorant amount of a dark color DC gradually increases as the value of the input color C1 increases. Thus, a rapid change in color because of a change in inclination of the maximum light-color amount LCmax is restricted. A change characteristic of the UCR ratio shown in FIG. 5A exhibits an increase in value of the light color LC (an increase in colorant amount of the light color LC) as compared with an example shown in FIG. 5B. Hence, the change characteristic is desirable if image quality, such as graininess and gradation, is emphasized.

Also, in the example shown in FIG. 5B, the function g1 is set such that the UCR ratio becomes 0% and the value of the light color LC is a minimum value (in this example, 0%) if the value of the input color C1 is a maximum value (100%). Also in this example, like the example shown in FIG. 5A, the function g1 is set such that the UCR ratio is held low if the value of the input color C1 is in a range from 0% to about 25%, and such that the UCR ratio monotonically decreases as the value of the input color C1 increases if the value of the input color C1 is in a range of about 40% or more. Accordingly, if the value of the input color C1 is within the range of about 40% or more, the value of the light color LC decreases as the value of the input color C1 increases, and the colorant of the dark color DC is used by that amount. For example, if the value of the input color C1 is the maximum value (100%), the value of the light color LC is 100%, the value of the dark color DC is 100%, and the total amount of C is 200% in the example shown in FIG. 5A, whereas the value of the light color LC is 0%, the value of the dark color DC is 100%, and the total amount of C is 100% in the example shown in FIG. 5B. As described above, the change characteristic of the UCR ratio shown in FIG. 5B exhibits that the colorant total amount to be used decreases as compared with the example shown in FIG. 5A. Hence, the change characteristic is desirable if cost (colorant consumption) is emphasized.

The change characteristic of the UCR ratio is not limited to the examples shown in FIGS. 5A and 5B, and other change characteristic may be used. In this exemplary embodiment, by adjusting the characteristics of the functions g1 and g2 that define the UCR ratios, the values of the light colors LC and LM are controlled in accordance with the characteristics of the functions g1 and g2, and the values of the light colors (and corresponding values of the dark colors) that meet the requests, such as image quality and cost, are obtained.

In step 118, maximum values of LC', LM' (i.e., values of LC and LM of the grid point of the computation subject) that solutions of DC, DM, and Y exist within an allowable color-difference range with respect to the reproduction target color of the grid point of the computation subject are calculated, by computing DC, DM, and Y using the color-prediction model (the above-described Expression (1)) while LC' and LM', which are temporary values of LC and LM, are changed with a ratio fixed under a condition of a colorant total amount limit value TAC for the grid point of the computation subject. In step 120, the reproduction target color (L*a*b*) of the grid point of the computation subject calculated in step 110 and the values of LC and LM calculated in step 118 are substituted into Expression (4). DC, DM, and Y of the grid point of the computation subject are computed with Expression (4) by a nonlinear optimization method such as a simplex method. Expression (4) is as follows:

$$(DC, DM, Y) = f^{-1}(L^*, a^*, b^*, LC, LM) \qquad (4).$$

For example, an algorithm of a simplex method is described in Hisenkei Keikaku Hou (Nonlinear Programming Method), Hiroshi KONNO, JUSE Press. Ltd., pp. 284-287. The simplex method is a method suitable for optimization of a multivariable function. An optimal value is able to be obtained at high speed. The simplex method has been described as an example of the nonlinear optimization method. Alternatively, other nonlinear optimization method, such as a bisection algorithm or a golden section search method, may be applied. Still alternatively, a numerical solution method, such as the Newton's method may be applied.

As described above, when the values (colorant amounts) of the respective colors including DC, DM, Y, LC, and LM are obtained for the grid point of the computation subject, in step 122, a conversion coefficient that associates the combination of the values of C1, M1, and Y1 of the grid point of the computation subject with the combination of the values of DC, DM, Y, LC, and LM computed as described above is stored in the memory 16 as a conversion coefficient of the grid point of the computation subject. In step 124, it is judged whether or not all grid points set in the input data space of the color-separation LUT 60 are selected as computation subjects. If NO, the process goes back to step 108, and the process from step 108 to step 124 is repeated until YES is obtained in step 124. If YES is obtained in step 124, the color-separation coefficient generation processing is ended.

Accordingly, the color-separation coefficient 52 is generated. The generated color-separation coefficient 52 is set in the color-separation LUT 60 when the color processor 22 performs the color processing, and is used for conversion by the color-separation LUT 60 from C1, M1, and Y1 to DC0, LC0, DM0, LM0, and Y2.

It is to be noted that different limit values TAC of colorant total amount may be occasionally set respectively for types of sheets (for example, normal paper, coated paper, etc.) on which images are formed by the image forming device 32. Hence, plural color-separation coefficients 52 are desirably generated respectively for the types of sheets (respectively for the control limits TAC of the colorant total amount that differ from one another in accordance with the types of sheets). When the color processor 22 performs the color processing, the color-separation coefficient 52 corresponding to the type of a sheet on which an image is formed by the image forming device 32 is desirably selectively set in the color-separation LUT 60. Also, even if the image forming apparatus 10 has a configuration that a user may change setting of the limit value TAC of the colorant total amount, plural color-separation coefficients 52 are formed to correspond to plural limit values TAC of the colorant total amount. When the color processor 22 performs the color processing, the color-separation coefficient 52 corresponding to the currently set limit value TAC of the colorant total amount is desirably selectively set in the color-separation LUT 60.

Figure 6:
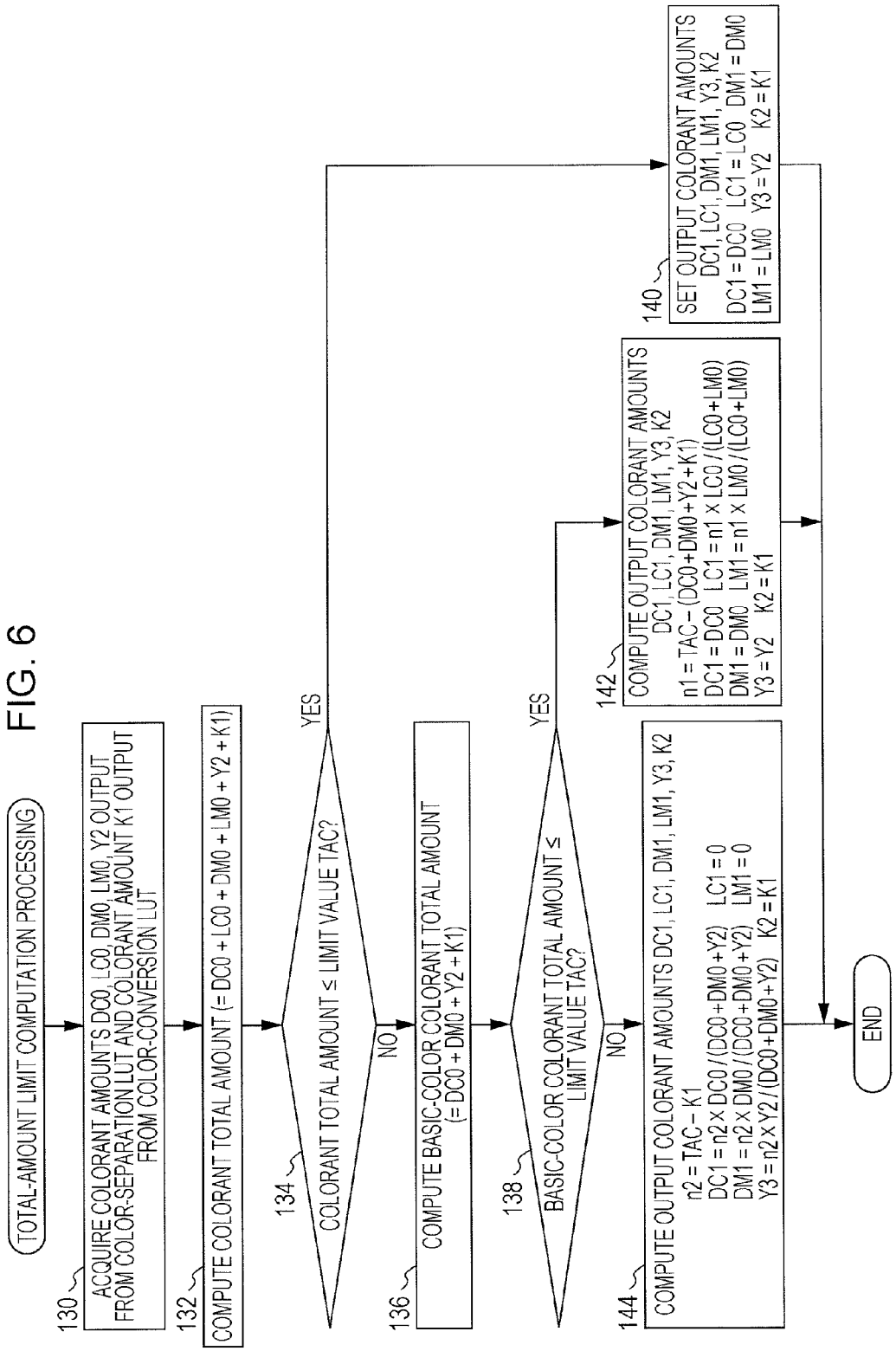
FIG. 6 is a flowchart showing contents of total-amount-limit computation processing.

Next, total-amount-limit computation processing performed by the total-amount-limit computing unit 62 when the color processor 22 performs the color processing will be described with reference to FIG. 6. The total-amount-limit computation processing is performed every time when colorant amounts DC0, LC0, DM0, LM0, and Y2 of any pixel of an image are output. In step 130, colorant amounts DC0, LC0, DM0, LM0, and Y2 of a certain pixel output from the color-separation LUT 60 and a colorant amount K1 of the same pixel output from the color-conversion LUT 58 are acquired. In step 132, a total value of colorant amounts of the acquired six-color colorants, that is, a colorant total amount (=DC0+LC0+DM0+LM0+Y2+K1) is computed.

In step 134, it is judged whether or not the colorant total amount of the six-color colorants computed in step 132 is the limit value TAC or smaller. If YES, it is not necessary to change the colorant amounts of the six-color colorants acquired in step 130, and hence the process goes to step 140, in which the colorant amounts DC0, LC0, DM0, LM0, Y2, and K1 are set to output colorant amounts DC1, LC1, DM1, LM1, Y3, and K2 without changing the values (see Expression (5)), and the processing is ended. Expression (5) is as follows:

$$DC1=DC0, LC1=LC0, DM1=DM0, LM1=LM0,$$
$$Y3=Y2, K2=K1 \quad (5).$$

If NO in step 134, the process goes to step 136, in which a colorant total amount (=DC0+DM0+Y2+K1) of basic colors (DC, DM, Y, and K) is computed, the basic colors being obtained by eliminating the light colors LC and LM from the six colors the colorant amounts of which are acquired in step 130. In step 138, it is judged whether or not a basic-color colorant total amount computed in step 136 is the limit value TAC or smaller.

If YES, although the six-color colorant total amount exceeds the limit value TAC, the six-color colorant total amount is restricted to the limit value TAC or smaller only by decreasing the colorant amounts of the light colors LC and LM. Hence, if YES in step 138, the process goes to step 142, in which, for the basic colors from among the six colors the colorant amounts of which are acquired in step 130, the colorant amounts DC0, DM0, Y2, and K1 are set to output colorant amounts DC1, DM1, Y3, and K2 without changing the values; and for non-basic colors (light colors LC and LM), output colorant amounts LC1 and LM1 that are decreased until the colorant total amount of the six colors meets the limit value TAC are computed while a ratio LC0:LM0 of the colorant amounts is maintained (see Expression (6)). Then, the processing is ended. Expression (6) is as follows:

$$DC1=DC0, DM1=DM0, Y3=Y2, K2=K1, \text{ and}$$

$$LC1=n1 \times LC0/(LC0+LM0), LM1=n1 \times LM0/(LC0+LM0),$$

$$\text{where } n1=TAC-(DC0+DM0+Y2+K1) \quad (6).$$

If NO in step 138, the six-color colorant total amount exceeds the limit value TAC. Even if the colorant amounts of the light colors LC and LM are set to 0, the six-color colorant total amount does not become the limit value TAC or smaller. Hence, if NO in step 138, the process goes to step 144, in which, for the non-basic colors (light colors LC and LM) from among the six colors the colorant amounts of which are acquired in step 130, the output colorant amounts LC1 and LM1 are set to 0; for the basic colors excluding K (DC, DM, and Y), output colorant amounts DC1, DM1, and Y3 that are decreased until the colorant total amount of the six colors meets the limit value TAC are computed while a ratio DC0:DM0:Y2 of the colorant amounts is maintained; and for only K, the colorant amount K1 is set to an output colorant amount K2 without changing the value (see Expression (7)). Then, the processing is ended. Expression (7) is as follows:

$$LC1=0, LM1=0, K2=K1,$$

$$DC1=n2 \times DC0/(DC0+DM0+Y2),$$

$$DM1=n2 \times DM0/(DC0+DM0+Y2), \text{ and}$$

$$Y3=n2 \times Y2/(DC0+DM0+Y2),$$

$$\text{where, } n2=TAC-K1 \quad (7).$$

As described above, when the colorant total amount exceeds the limit value TAC, the colorant amounts of the light colors LC and LM are preferentially decreased. If the colorant total amount does not become the limit value TAC or smaller even if the colorant amounts of the light colors LC and LM are set to 0, the colorant amounts of the basic colors (DC, DM, and Y) other than K are decreased. Hence, this configuration prevents degradation in color reproducibility and reduction in color gamut, which may occur by decreasing the colorant amounts because of limitation of the colorant total amount, as compared with an aspect in which the colorant amounts of the respective colors are decreased such that the colorant total amount becomes the limit value TAC or smaller while the ratio of the colorant amounts of the respective colors is maintained.

The total-amount-limit computation processing is not limited to the above-described processing in which, if the colorant total amount exceeds the limit value TAC, the colorant amounts of the light colors LC and LM are preferentially decreased; and if the colorant total amount does not become the limit value TAC or smaller even if the colorant amounts of the light colors LC and LM are set to 0, the colorant amounts of the basic colors other than K (DC, DM, and Y) are decreased. As the total-amount-limit computation processing, processing of decreasing the colorant amounts of the respective colors such that the colorant total amount becomes the limit value TAC or smaller while a ratio of the colorant amounts of the respective colors are maintained may be included in the scope of the invention.

In the above description, the color-separation coefficient 52 set in the color-separation LUT 60 is previously generated by the color-separation coefficient generation processing (FIG. 3) (according to an exemplary embodiment). It is not limited thereto. For example, according to an exemplary embodiment, formation of color charts, reading of the color charts, and computation of L*a*b* for each color chart may be previously performed and results may be stored in the storage unit 18 or the like. Then, when the color processor 22 performs the color processing, a conversion coefficient generator that performs processing from step 106 to step 124 of the color-separation coefficient generation processing (FIG. 3) based on the above results may be provided. After the conversion-coefficient generator generates the color-separation coefficient 52, output colors DC0, LC0, DM0, LM0, and Y2 corresponding to input colors C1, M1, and Y1 may be obtained by interpolation computation by the color-separation LUT 60.

In the above description, the color-separation LUT 60 performs conversion from C, M, and Y to DC, LC, DM, LM, and Y. However, the N colors of the input color signal are not limited to C, M, Y, and K. For example, the N colors may be R, G, B, and K; X, Y, Z, and K; or L*, a*, b*, and K. Also, the M colors of the output color signal are not limited to DC, LC, DM, LM, and Y. For example, for a non-basic color, at least one of orange (O), green (G), and violet (V) may be used instead of LC and LM; or a combination of at least one of LC and LM and at least one of O, G, and V may be used. Of course, the number of colors M of the output color signal is not limited to six. Even when any of O, G, and V is used as a non-basic color, like LC and LM, if the colorant total amount exceeds the limit value TAC, the non-basic color is decreased with a preference over the basic colors (DC, DM, and Y). Hence, degradation in color reproducibility and reduction in color gamut may be restricted. When the colorant total amount exceeds the limit value TAC, since O, G, and V which are the non-basic colors are mixed with the basic colors and K, the basic colors and K more affect the color reproducibility than the non-basic colors do.

In the above description, the image forming device 32 has a configuration that uses a toner as the colorant and forms an image by the electrophotographic system. However, the invention is not limited thereto. The image forming device 32 may use a colorant other than the toner and form an image by a system other than the electrophotographic system, such as when an image is formed by an inkjet method.

In the above description, the specific color is K. However, the invention is not limited thereto. Using a color other than K as the specific color may be included in the scope of the invention.

EXAMPLE

Next, an experiment performed by the inventors and the like of the subject application is described to check the effect of the exemplary embodiment of the invention. In a case in which input colors C, M, Y, and K are converted into output colors DC, LC, DM, LM, Y, and K, in order to check that the computational load of the interpolation computation of the LUT is decreased when the configuration according to the above-described exemplary embodiment is employed, in which C, M, and Y from among the input colors C, M, Y, and K are converted into DC, LC, DM, LM, and Y by the 3D (3-input 5-output) LUT, and then the output colors DC, LC, DM, LM, Y, and K are obtained by adding K and performing the total-amount-limit computation, instead of the related-art method in which the input colors C, M, Y, and K are converted into the output colors DC, LC, DM, LM, Y, and K by the 4D (4-input 6-output) LUT, the inventors and the like use a computer to perform processing of converting the input colors C, M, Y, and K into the output colors DC, LC, DM, LM, Y, and K for each pixel by the method of the related art and the method of the exemplary embodiment of the invention for plural images (images A to F), and processing time is measured. The results are shown in FIG. 7.

Figure 7:
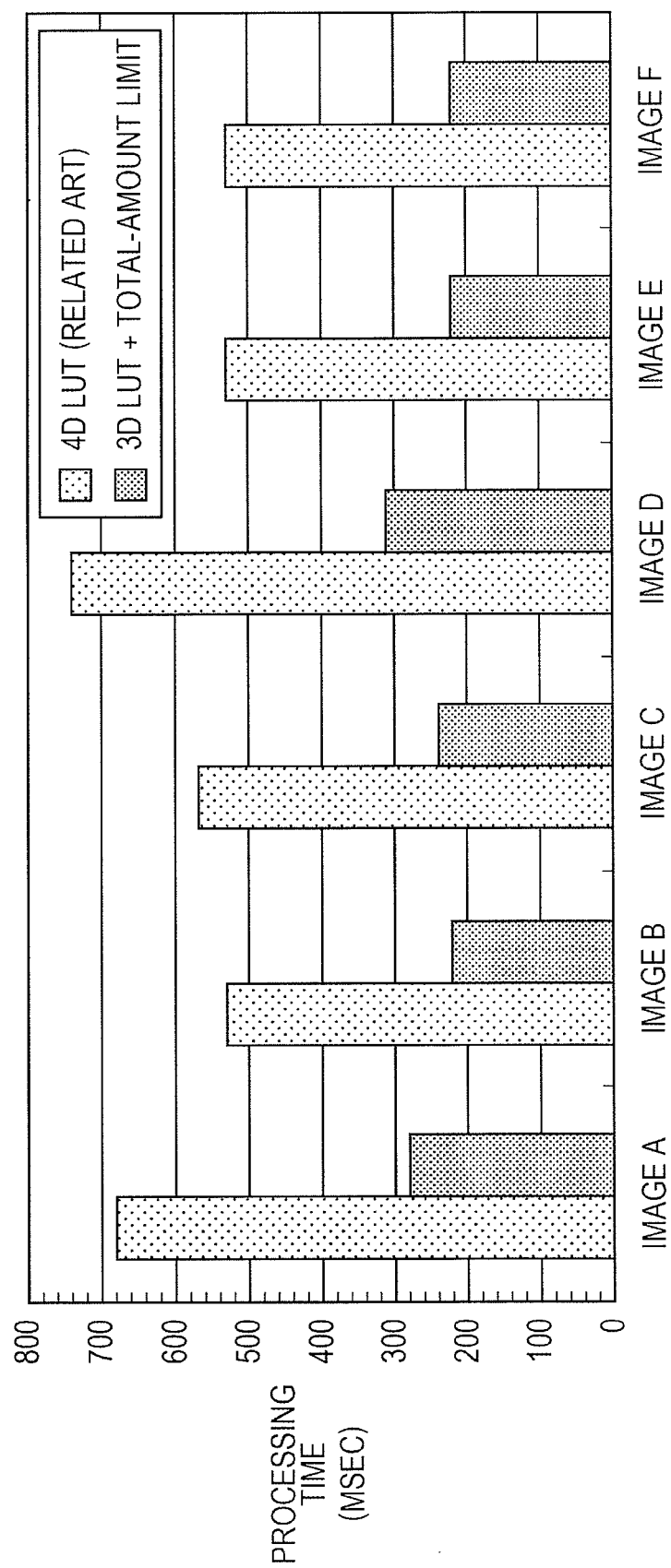
FIG. 7 is a diagram showing results of an experiment executed by inventors etc. of the subject application.

As shown in FIG. 7, in the method according to the exemplary embodiment of the invention, the processing is completed in a processing time that is ½ or less of a processing time of the method of the related art. It is checked that the computational load of the interpolation computation of the LUT is markedly decreased. In this experiment, the interpolation computation of the LUT is performed with the computer. If the interpolation computation of the LUT is performed by hardware (electronic circuit), since the computational load is markedly decreased as checked through the above experiment, the circuit scale may be reduced to ½ or smaller.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A color processing device, comprising:
a converter that converts a combination of values of N−1 colors, which are obtained by eliminating a specific color included in N colors from an input color signal expressing a color by a combination of values of the N colors, into a corresponding combination of values of M−1 colors, N being 4 or larger, M being larger than N; and
an output unit that, if a total value of the values of the M−1 colors after the conversion by the converter and a value of the specific color included in the input color signal exceeds a predetermined limit value, changes a value of at least one of M colors, which are obtained by adding the specific color to the M−1 colors, such that the total value becomes the limit value or smaller, and outputs values of the M colors as an output color signal,
wherein the M colors of the output color signal includes a basic color and a non-basic color, and
wherein, when a total value of the values of the M colors exceeds the limit value, the output unit judges whether or not a total value of values of remaining colors exceeds the limit value, the remaining colors being obtained by eliminating the non-basic color from the M colors, changes a value of the non-basic color such that the total value of the values of the M colors becomes the limit value or smaller if the total value of the values of the remaining colors is the limit value or smaller, and changes the value of the non-basic color into a predetermined minimum value and changes a value of the basic color such that the total value of the values of the M colors becomes the limit value or smaller if the total value of the values of the remaining colors exceeds the limit value.

2. The color processing device according to claim 1,
wherein the N colors of the input color signal and the M colors of the output color signal each include black, and
wherein the converter converts the combination of the values of the N−1 colors, which are obtained by eliminating the black serving as the specific color from the N colors, into the corresponding combination of the values of the M−1 colors, which are obtained by eliminating the black serving as the specific color from the M colors.

3. The color processing device according to claim 1, wherein the converter converts the combination of the values of the N−1 colors into the corresponding combination of the values of the M−1 colors within a range satisfying that a total value of the values of the M−1 colors is the limit value or smaller, M being larger than N.

4. The color processing device according to claim 1,
wherein the basic color is at least three colors capable of being reproduced even if the non-basic color is not used, and wherein the non-basic color is at least one of a light color with a density lower than a density of the basic color and a special color having a hue different from a hue of the basic color.

5. The color processing device according to claim 1,
wherein the M−1 colors include a basic color and a light color with a density lower than a density of the basic color, and
wherein the converter converts the combination of the values of the N−1 colors into the corresponding combination of the values of the M−1 colors by determining a maximum light-color amount, which is a maximum value of the light color, within a range of a predetermined color difference from the combination of the values of the N−1 colors of the input color signal, obtaining a value of the light color included in the M−1 colors in accordance with the determined maximum light-color amount and an under color removal ratio, and obtaining a value of the basic color included in the M−1 colors from the obtained value of the light color and the combination of the values of the N−1 colors of the input color signal.

6. The color processing device according to claim 5, wherein the under color removal ratio is set based on a function for a value of one of the N−1 colors of the input color signal.

7. The color processing device according to claim 5, wherein the maximum light-color amount is determined within a range satisfying that the total value of the values of the M−1 colors is the limit value or smaller.

8. The color processing device according to claim 1,
wherein the M−1 colors include a basic color and a light color with a density lower than a density of the basic color,
wherein the converter converts the combination of the values of the N−1 colors into the corresponding combination of the values of the M−1 colors by performing interpolation computation based on conversion data that associates a plurality of combinations of values of the N−1 colors with a plurality of corresponding combinations of values of the M−1 colors, and
wherein the conversion data is previously generated by determining a maximum light-color amount, which is a maximum value of the light color, within a range of a predetermined color difference from the combination of the values of the N−1 colors of the input color signal, obtaining a value of the light color included in the M−1 colors in accordance with the determined maximum light-color amount and an under color removal ratio, and performing processing of obtaining a value of the basic color included in the M−1 colors from the obtained value of the light color and the combination of the values of the N−1 colors of the input color signal for each of the plurality of combinations of the values of the N−1 colors.

9. The color processing device according to claim 8, wherein the under color removal ratio is set based on a function for a value of one of the N−1 colors of the input color signal.

10. The color processing device according to claim 8, wherein the maximum light-color amount is determined within a range satisfying that the total value of the values of the M−1 colors is the limit value or smaller.

11. The color processing device according to claim 1, further comprising:
a color signal converter that converts a color signal that is input, into a color signal corresponding to a color reproducibility of a color reproducing device to which the output color signal is input, and
wherein the color signal after the color-signal conversion by the color signal converter is input as the input color signal to the converter.

12. A non-transitory computer readable medium storing a program causing a computer to execute a process for color processing, the process comprising:
converting a combination of values of N−1 colors, which are obtained by eliminating a specific color included in N colors from an input-color signal expressing a color by a combination of values of the N colors, into a corresponding combination of values of M−1 colors, N being equal to or larger than 4, M being larger than N; and
if a total value of the values of the M−1 colors after the conversion and a value of the specific color included in the input-color signal exceeds a predetermined limit value, changing a value of at least one of M colors, which are obtained by adding the specific color to the M−1 colors, such that the total value becomes the limit value or smaller, and outputting values of the M colors as an output color signal,
wherein the M colors of the output color signal includes a basic color and a non-basic color, and
wherein, when a total value of the values of the M colors exceeds the limit value, the process further comprises determining whether or not a total value of values of remaining colors exceeds the limit value, the remaining colors being obtained by eliminating the non-basic color from the M colors, changing a value of the non-basic color such that the total value of the values of the M colors becomes the limit value or smaller if the total value of the values of the remaining colors is the limit value or smaller, and changing the value of the non-basic color into a predetermined minimum value and changes a value of the basic color such that the total value of the values of the M colors becomes the limit value or smaller if the total value of the values of the remaining colors exceeds the limit value.

13. An image processing method comprising:
converting a combination of values of N−1 colors, which are obtained by eliminating a specific color included in N colors from an input-color signal expressing a color by a combination of values of the N colors, into a corresponding combination of values of M−1 colors, N being equal to or larger than 4, M being larger than N; and
if a total value of the values of the M−1 colors after the conversion and a value of the specific color included in the input-color signal exceeds a predetermined limit value, changing a value of at least one of M colors, which are obtained by adding the specific color to the M−1 colors, such that the total value becomes the limit value or smaller, and outputting values of the M colors as an output color signal,
wherein the M colors of the output color signal includes a basic color and a non-basic color, and
wherein, when a total value of the values of the M colors exceeds the limit value, the method further comprises determining whether or not a total value of values of remaining colors exceeds the limit value, the remaining colors being obtained by eliminating the non-basic color from the M colors, changing a value of the non-basic color such that the total value of the values of the M colors becomes the limit value or smaller if the total value of the values of the remaining colors is the limit value or smaller, and changing the value of the non-basic color into a predetermined minimum value and changes a value of the basic color such that the total value of the values of the M colors becomes the limit value or smaller if the total value of the values of the remaining colors exceeds the limit value.

* * * * *